(12) United States Patent
Matsushita et al.

(10) Patent No.: US 8,243,805 B2
(45) Date of Patent: Aug. 14, 2012

(54) VIDEO COMPLETION BY MOTION FIELD TRANSFER

(75) Inventors: Yasuyuki Matsushita, Beijing (CN); Sing Bing Kang, Redmond, WA (US); Xiaoou Tang, Beijing (CN); Takaaki Shiratori, Tokyo (JP)

(73) Assignee: Microsoft Corporation, Redmond, WA (US)

( * ) Notice: Subject to any disclaimer, the term of this patent is extended or adjusted under 35 U.S.C. 154(b) by 1674 days.

(21) Appl. No.: 11/559,861

(22) Filed: Nov. 14, 2006

(65) Prior Publication Data

US 2008/0112642 A1 May 15, 2008

(51) Int. Cl.
*H04N 7/12* (2006.01)
(52) U.S. Cl. .................................................. 375/240.16
(58) Field of Classification Search .............. 375/240.16
See application file for complete search history.

(56) References Cited

U.S. PATENT DOCUMENTS

| | | | |
|---|---|---|---|
| 5,036,393 A | 7/1991 | Samad et al. | |
| 5,363,146 A | 11/1994 | Saunders et al. | |
| 5,398,068 A | 3/1995 | Liu et al. | |
| 5,550,847 A * | 8/1996 | Zhu | 714/748 |
| 5,581,308 A | 12/1996 | Lee | |
| 5,621,467 A * | 4/1997 | Chien et al. | 375/240.15 |
| 5,912,707 A * | 6/1999 | Kim | 375/240.16 |
| 6,192,079 B1 | 2/2001 | Sharma et al. | |
| 6,233,007 B1 | 5/2001 | Carlbom et al. | |
| 6,665,423 B1 | 12/2003 | Mehrotra et al. | |
| 7,020,207 B1 | 3/2006 | Tavares | |
| 2002/0030739 A1 | 3/2002 | Nagaya et al. | |
| 2005/0152458 A1* | 7/2005 | Tanaka | 375/240.27 |
| 2006/0078156 A1 | 4/2006 | Varekamp et al. | |
| 2006/0257042 A1* | 11/2006 | Ofek et al. | 382/255 |

OTHER PUBLICATIONS

Gyaourova, et al., "Block Matching for Object Tracking", Lawrence Livermore National Laboratory, Ucrl-Tr-200271, Oct. 14, 2003, pp. 1-13.
Matsushita et al., "Full-frame Video Stabilization", Microsoft Research Asia, Mar. 2005, 8 pp.
Wexler, et al., "Space-Time Video Completion", The Weizmann Institute of Science, Dept. Of Computer Science and Applied Math, Pro 2004 IEEE Comuter Society Conf on Computer Vision and Pattern Recognition, Jun. and Jul. 2004, 8 pp.

* cited by examiner

*Primary Examiner* — Jay Au Patel
*Assistant Examiner* — Richard Torrente
(74) *Attorney, Agent, or Firm* — Lee & Hayes, PLLC

(57) ABSTRACT

Systems and methods for video completion by motion field transfer are described. In one aspect, a spatio-temporal target patch of an input video data sequence is filled in or replaced by motion field transfer from a spatio-temporal source patch of the input video data sequence. Color is propagated to corresponding portions of the spatio-temporal target patch by treating the transferred motion information as directed edges. These motion field transfer and color propagation operations result in a video completed spatio-temporal target patch. The systems and methods present the video data sequence, which now includes the video completed spatio-temporal target patch, to user for viewing.

17 Claims, 4 Drawing Sheets

VIDEO COMPLETION BY MOTION FIELD TRANSFER

BACKGROUND

Video completion refers to a process of filling in missing pixels or replacing pixels in a video. Video completion can be used, for example, to restore damaged or vintage videos, restore corrupted internet video streams (e.g., due to packet drops), remove unwanted objects in post video production editing operations, and/or so on. Existing video completion techniques typically treat a video data sequence as a set of independent 2D image frames to try to locate temporal color/intensity transitions across respective ones of the 2D frames. However, temporal consistency of filled-in (i.e., present or non-missing) portions of a video data sequence cannot be guaranteed. For instance, periodic color transitions in a video stream are often imperceptible or absent.

SUMMARY

Systems and methods for video completion by motion field transfer are described. In one aspect, a spatio-temporal target patch of an input video data sequence is filled in or replaced by motion field transfer from a spatio-temporal source patch of the input video data sequence. Color is propagated to corresponding portions of the spatio-temporal target patch by treating the transferred motion information as directed edges. These motion field transfer and color propagation operations result in a video completed spatio-temporal target patch. The systems and methods present the video data sequence, which now includes the video completed spatio-temporal target patch, to user for viewing.

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

DETAILED DESCRIPTION

Overview

Systems and methods for video completion by motion field transfer (described below with respect to FIGS. 1 through 4) copy low-level local motion fields (vectors) associated with pixels in a spatio-temporal source patch of video data into a spatio-temporal target patch of video data. To accomplish this, the systems and methods compute motion vector fields for present/non-missing pixels of the video data. Low-level local motion fields/vectors are then estimated for pixel locations in the target patch by evaluating spatio-temporal areas/patches/regions of the computed motion fields to identify an optimal set of the computed motion fields to transfer to locations in the target patch. The local motion estimations are completely independent of temporal consistency of color across respective ones of frames of the video data.

The spatio-temporal area associated with the identified optimal set of motion fields is called an optimal source patch. The optimal source patch has low-level local motion fields most similar to motion in the target patch. The systems and methods progressively transfer (from boundaries of the target patch working inwards) low-level local motion fields from the optimal source patch to corresponding locations in the target patch. By treating the transferred low-level motion fields as directed edges, the systems and methods propagate color information to further define corresponding pixels in the target patch. The systems and methods present the video data, which now includes the video completed target patch, to a user.

These and other aspects of the systems and methods for video completion by motion field transfer are now described in greater detail.

An Exemplary System

Although not required, systems and methods for video completion by motion field transfer are described in the general context of computer-executable instructions executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 1:
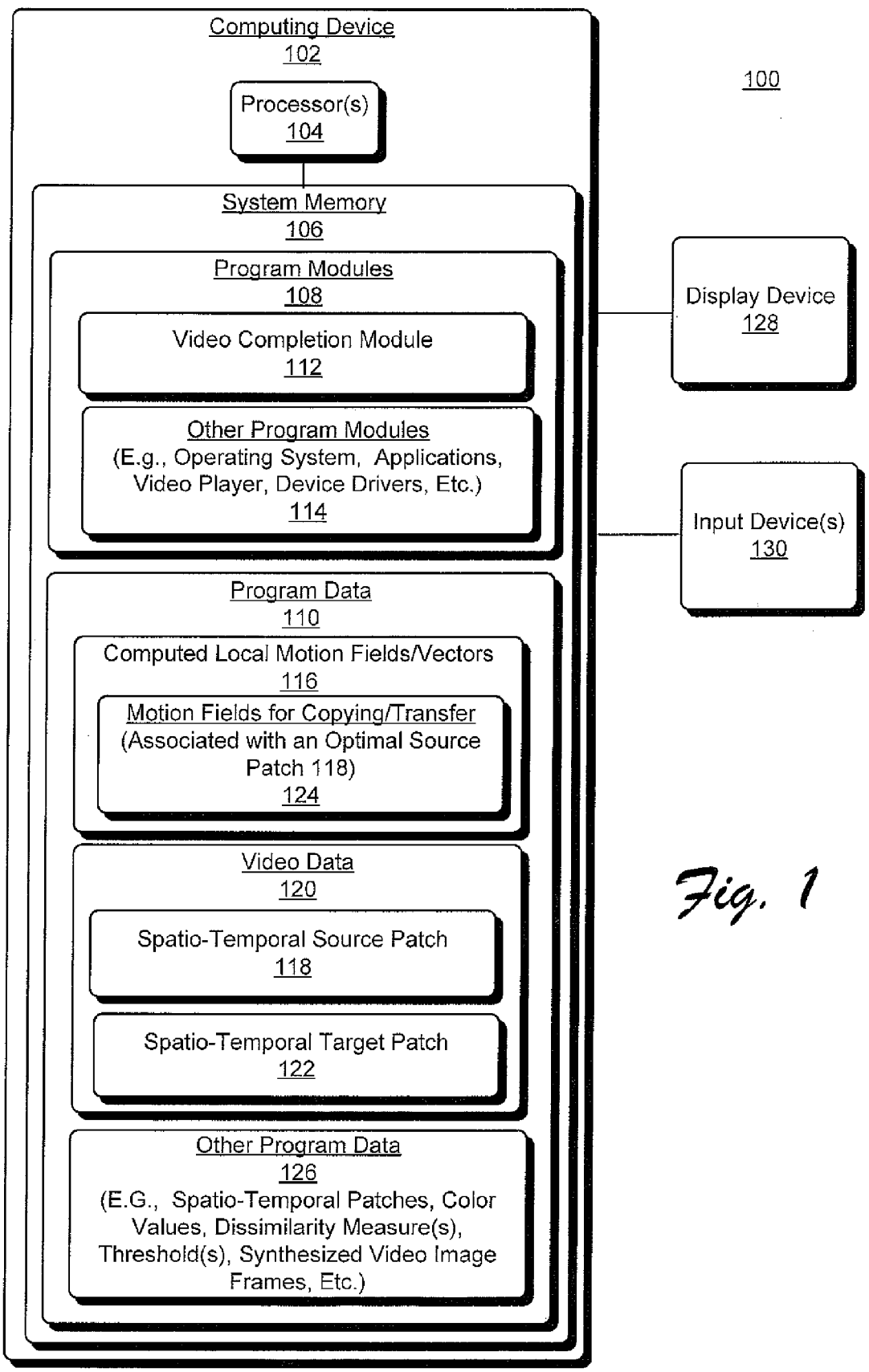
FIG. 1 shows an exemplary system for video completion by motion field transfer, according to one embodiment.

FIG. 1 shows an exemplary system 100 for video completion by motion field transfer, according to one embodiment. System 100 includes a computing device 102, for example a general purpose computing device, a server, a laptop, a mobile computing device, and/or so on. Computing device 102 includes one or more processors 104 coupled to a tangible computer-readable storage medium (system memory 106). Processor 104 may be a microprocessor, microcomputer, microcontroller, digital signal processor, etc. System memory 106 includes, for example, volatile random access memory (e.g., RAM) and non-volatile read-only memory (e.g., ROM, flash memory, etc.). System memory 106 comprises computer-program instructions executable by processor 104, and program data that is generated and/or used by respective ones of the computer-program instructions. Such computer-program instructions and program data are respectively shown as program modules 108 and program data 110. Program modules 108 include, for example, video completion module 112 and "other program modules" 114 such as an Operating System (OS) to provide a runtime environment, and other applications such as a video player to present results of video completion module 112 to a user, device drivers, etc.

Video completion module 112 implements video completion operations by transferring a set of computed local motion fields 116 from an optimal spatio-temporal source patch 118 of video data 120 to corresponding locations in a spatio-temporal target patch 122 of video data 120. In one implementation, video completion module 112 provides video completion operations to fill-in (provide) missing local motion field and pixel color information to corresponding locations in the spatio-temporal target patch ("target patch") 122. In another implementation, video completion module 112 provides video completion operations to remove or replace existing local motion field and pixel information in the target patch 122.

In one implementation, for example, a user manually specifies target patch 122, for instance, using an input device 130 such as a pen or other pointing device, etc., to define a target patch 122. To facilitate user specification of a target patch 122, video completion module 112 (or other application 114) presents respective image frame(s) of video data 120 on a display device 128. The user delineates or outlines target patch 122 using the input device 130. In another implementation, video completion module 112 or another application 114 automatically defines/identifies a target patch 122 from a respective portion of video data 120 based on user selected and/or predetermined criteria. Such criteria include, for example, a determination of whether operations of video completion module 112 are to be used to fill-in missing pixels or remove object(s) with certain characteristics (e.g., text, saturated graphics, facial areas, etc.). Techniques to segment/identify areas of text, saturated graphics, or other objects, and techniques to identify portions of video data with missing pixels, etc., are known. Independent of how a target patch 122 is defined, video completion module 112 ensures that dimensions of a target patch 122 encapsulate some motion field information to facilitate video completion operations. For instance, in one implementation, if a target patch is for filling-in missing pixels and if the original patch dimensions do not include motion information, video completion module 112 automatically dilates boundaries of the target patch 122 to encapsulate a threshold amount of motion information.

Video completion module 112 implements video completion via local motion estimation, motion field transfer, and color propagation operations. To these ends, video completion module 112 computes local motion fields 116 for at least a subset of pixels that are present (non-missing) in video data 120. Video completion module 112 then locates a subset of the local motion fields 116 to transfer to corresponding locations in the target patch 122. This is accomplished by evaluating spatio-temporal areas/patches of the computed local motion fields to identify an optimal set of the computed motion fields to transfer to locations in the target patch. The local motion estimations are completely independent of temporal consistency of color across respective ones of frames of video data 120. The spatio-temporal area associated with the identified optimal set of motion fields is called an optimal source patch (a respective source patch 118). The optimal source patch has low-level local motion fields 116 collectively most similar to motion in the target patch. Computed motion fields 116 associated with the optimal source patch are shown as "motion fields for copying/transfer" 124.

Video completion module 112 progressively transfers low-level local motion fields 124 from the optimal source patch 118 to corresponding locations (from boundaries of the target patch working inwards) in the target patch 122. Based on pixel information associated with respective ones of the transferred low-level motion fields 124, video completion module 112 propagates color information to corresponding pixels in the target patch 122. For purposes of exemplary illustration, such color information is shown as respective portion of "other program data" 126. Video completion module 112 presents video data 120, which now includes the video completed target patch 122, to a user via display device 128.

Figure 2:
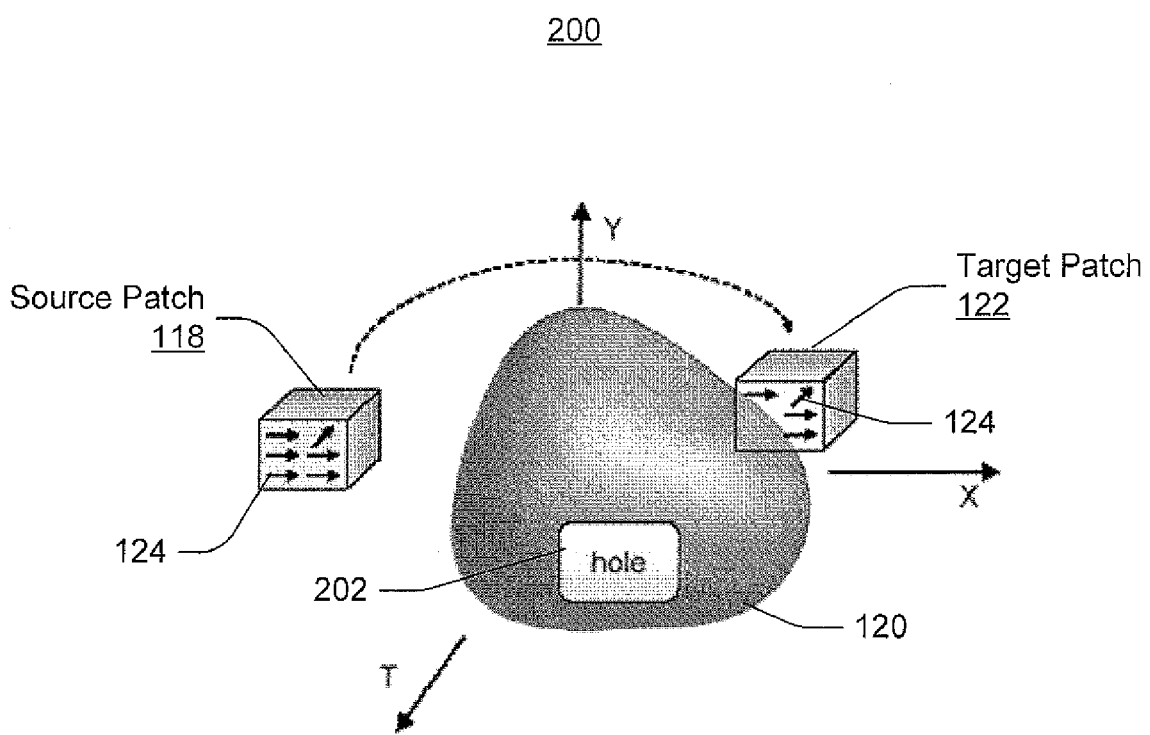
FIG. 2 shows an exemplary illustration of video completion by motion field transfer, according to one embodiment.

FIG. 2 shows an exemplary illustration 200 of video completion by motion field transfer, according to one embodiment. For purposes of exemplary description, aspects of FIG. 2 are described with respect to FIG. 1. (The left-most numeral of a reference number indicates the figure in which the referenced component was first introduced). FIG. 2 shows video data 120 (i.e., a spatio-temporal input video data volume (x, y, and t)). Low-level local motion fields 124 are copied from a source patch 118 to target patch 122. In this example, the target patch 122 corresponds to at least a portion of a spatio-temporal video hole 202 of missing pixel information in the video data 120.

Exemplary Local Motion Estimation Operations

In one implementation, video completion module 112 computes each local motion field 116 via hierarchical Lucas-Kanade optical flow computation operations. Specifically, in a coarse-to-fine manner, video completion module 112 estimates a motion vector/field $(u,v)^T$ that minimizes the following error function:

$$\operatorname*{argmin}_{(u,v)} \sum \left( u \frac{\partial I}{\partial x} + v \frac{\partial I}{\partial y} + \frac{\partial I}{\partial t} \right), \tag{1}$$

where $\partial I/\partial x$, $\partial I/\partial y$ and $\partial I/\partial t$ are image derivatives along spatial and temporal axes. A computed motion vector 116 at point $p=(x,y,t)^T$ in the video sequence is estimated by $(u(p), v(p))^T$.

Dissimilarity Measure of Motion Vectors/Fields

Video completion module 112 operations are based on non-parametric sampling of a motion field 116. Since 2D optical flow can be viewed as a 3D vector in a spatio-temporal domain with the constant temporal element being t, a 3D vector m is defined as $m=(ut,vt,t)^T$. Video completion module 112 measures distance between two motion vectors (respective portions of computed local motion fields 116) using an angular difference (in 3D space) as follows:

$$d_m(m_0, m_1) = 1 - \frac{m_0 \cdot m_1}{|m_0||m_1|} = 1 - \cos\theta, \tag{2}$$

where $\theta$ is the angle between two motion vectors $m_0$ and $m_1$. This angular error measure accounts for differences in both direction and magnitude, since measurements are in homogeneous coordinates.

Motion Field Transfer

Using the dissimilarity measure of Eq. (2), video completion module 112 seeks a most similar source patch 118 representing a subset of the computed local motion fields 116 given a target patch 122. Dissimilarity between a source patch $P_s$ and a target patch $P_t$ is calculated by aggregating the dissimilarity measure over the patches (ignoring missing pixels in a target patch 122). That is, similarity between a source patch 118 and a target patch 122 is based on a collective measurement of similarity of motion vectors in the source patch to motion vectors in the target patch. Suppose a set of valid pixels in the target patch is D; the aggregate distance between the source patch 118 and the target patch 122 is defined as follows:

$$d(P_s(x_s), P_t(x_t)) = \frac{1}{|D|} \sum_{p \in D} d_m(m(p + x_s), m(p + x_t)), \tag{3}$$

where $|D|$ is the number of defined pixels, $x_s$ and $x_t$ represent the position of the source and target patches, and p is the relative position from the center of each patch. Given a target patch $P_t$ with its location $x_t$, an optimal source patch $\hat{p}_x$ is obtained by finding the appropriate $x_s$ which minimizes Eq. (3) as $$\hat{P}_s(\hat{x}_s) = \arg\min_{P_s(x_s)} d(P_s(x_s), P_t(x_t)). \tag{4}$$

Once an optimal source patch $\hat{p}_s$ (118) is found, video completion module 112 fills in missing pixels in the target patch 122 by copying the motion vectors 124 from the corresponding positions of the source patch 122. Computation of video completion module's motion field transfer operations starts from a boundary of a hole representing one or more missing pixels in the target patch 122, and progressively advances inwards. In this manner, video completion module 112 gradually fills in data for missing pixels (or replaces data for existing pixels) with new motion vectors ("motion fields for copying/transfer" 124) which are copied from one or more corresponding optimal source patches 118. In one implementation, a "hole" of mixing pixels is represented by multiple target patches 122, which are filled in with motion information from one or more source patches 118. Once a missing (or existing) pixel is assigned a motion vector 124, video completion module 112 treats the pixel as a defined (non-missing, or present) video pixel in the following computation. In this implementation, the order of pixel selection in a target patch 122 is determined by the number of non-hole pixels in the target patch 122. The target patch 122 with the highest number of non-hole pixels is first used for video completion operations.

In this implementation, video completion module 112 implements hierarchical matching using a Gaussian pyramid of a video volume (i.e., a target patch 122). The process of matching involves comparing neighboring values (i.e., motion vectors) and taking the motion vector with the most similar neighboring motion vectors. Matching is used in the filling process described in the preceding paragraph. Let $l_m$ be the number of levels (e.g., 3) in the pyramid. Starting from the finest level $l=1$, the coarser levels of the video volume are successively generated by convolving with a Gaussian kernel and sub-sampling. In one implementation, video completion module 112 sets patch size for matching in pyramid level 1 to $2^\beta \times 2^\beta \times 2^\beta$, where $\beta = l_m - l + 1$. This patch size has the same size as the target patch size. A Gaussian kernel sigma used to blur one level to a next coarser level is set to one-fourth of patch size for matching, i.e., in one implementation the Gaussian kernel sigma is set to $2^{\beta-2}$.

Exemplary Color Propagation Operations

Once motion vectors 124 have been copied to respective portions of a target patch 122, video completion module 112 propagates color information to corresponding portions of the target patch 122. That is, color values of missing or replaced video pixels are computed by propagating color information from defined image pixels using transferred motion fields/vectors 124. Transferred motion vectors 124 indicate pixel relationships with neighboring pixels. Specifically, video completion module 112 treats motion vectors 124 as undirected edges that represent pixel correspondences among respective ones of the frames in the video data 120.

Figure 3:
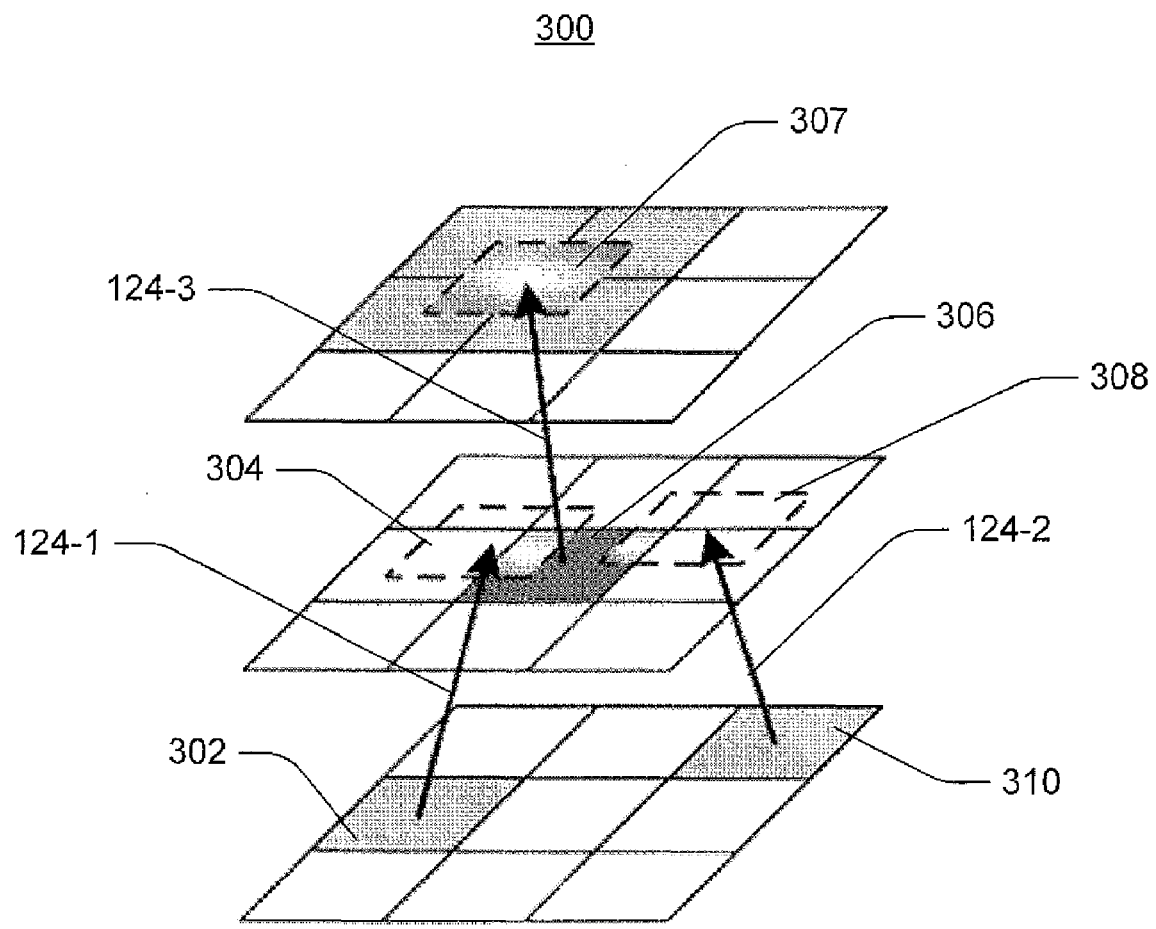
FIG. 3 shows an exemplary illustration of color propagation for video completion operations, according to one embodiment.

FIG. 3 shows an exemplary illustration of color propagation for video completion operations, according to one embodiment. More particularly, FIG. 3 shows a stacked 3×3 pixel sub-image 300 over three time instances (increasing in time from the bottom frame (shown as a planer 3×3 layer) to the top frame). In view of these frames, video completion module 112 assigns a color value to a pixel p in a target patch 122 using connected pixels $q \in N$. In other words, and for exemplary illustration purposes, assume pixel p is a target patch 122 with $q \in N$ being source patches 118; q is a member of the set N of pixels that are neighbors of p. Suppose the local motion vectors 116 have been computed (three such vectors shown as arrowed edges 124-1, 124-2, and 124-3). Note that p (e.g., pixel 306) may point to a fractional location (e.g., pixel 307) in a next frame as shown in FIG. 3. Points 302 and 310 are members of N, i.e., they are neighbors of p. Point 302 in a previous frame may be connected to a fractional location 304, and point 310 connected to a fractional location 308. Video completion module 112 utilizes the sizes of overlapped areas s(p,q) (overlaps between pixels 304 and 306, and between pixels 308 and 306) as weight factors to determine the contribution of neighboring pixels q to pixel p. Video completion module 112 also utilizes reliability of the edge r(p,q), which is measured by the inverse of dissimilarity measure defined in Eq. (3). The contribution from the neighboring pixel q to the pixel p is given by the product of r and s as follows:

$$w(p,q) = r(p,q)s(p,q) \tag{5}$$

Thus, the color c(p) at pixel p is a weighted average of colors at the neighboring pixels q:

$$c(p) = \frac{\sum_{q \in N} w(p, q) c(q)}{\sum_{q \in N} w(p, q)}. \tag{6}$$

Given nT hole pixels, for each pixel $\{p_i; i=1, \ldots, n\}$ video completion module 112 utilizes an equation based on Eq. (6). Assuming there are m boundary pixels $\{p_j^b; j=1, \ldots, m\}$ with known colors, the n equations form the following linear system of equations:

$$C = [W | W_b] \begin{bmatrix} C \\ C_b \end{bmatrix}, \tag{7}$$

where C is a 3×n matrix $C = [c(p_1), \ldots, c(p_n)]^T$, $C_b$ is a 3×m matrix $C_b = [c(p_{b_1}), \ldots, c(p_{b_m})]^T$, and the m×n matrix W and m×n matrix $W_b$ are given by $$W = \begin{bmatrix} 0 & w_{12} & \cdots & w_{1n} \\ w_{21} & 0 & \cdots & w_{2n} \\ \vdots & \vdots & \ddots & \vdots \\ w_{n1} & w_{n2} & \cdots & 0 \end{bmatrix}, W_b = \begin{bmatrix} w_{11}^b & \cdots & w_{1m}^b \\ \vdots & \ddots & \vdots \\ w_{n1}^b & \cdots & w_{nm}^b \end{bmatrix}.$$

Here $w_{ij}$ represents the weight factor $w(p_i, p_j)$ after normalization, such that each row of $[W | W_b]$ sums to one. Therefore, $w_{ij}$ falls in the range [0,1]. The diagonal elements of W are all zero, since the motion vector never points the source pixel to itself. To obtain C, Eq. (7) can be written as $$C = (I - W)^{-1} W_b C_b \tag{8}$$

where I is the n×n identity matrix. The matrix (I−W) is usually invertible, and the solution can be efficiently obtained by LU decomposition since the matrix is structurally symmetric and sparse. If the determinant of (I−W) is very small (indicating closeness to singularity), video completion module 112 computes its pseudo-inverse through singular value decomposition to obtain the least-squares solution.

An Exemplary Procedure

Figure 4:
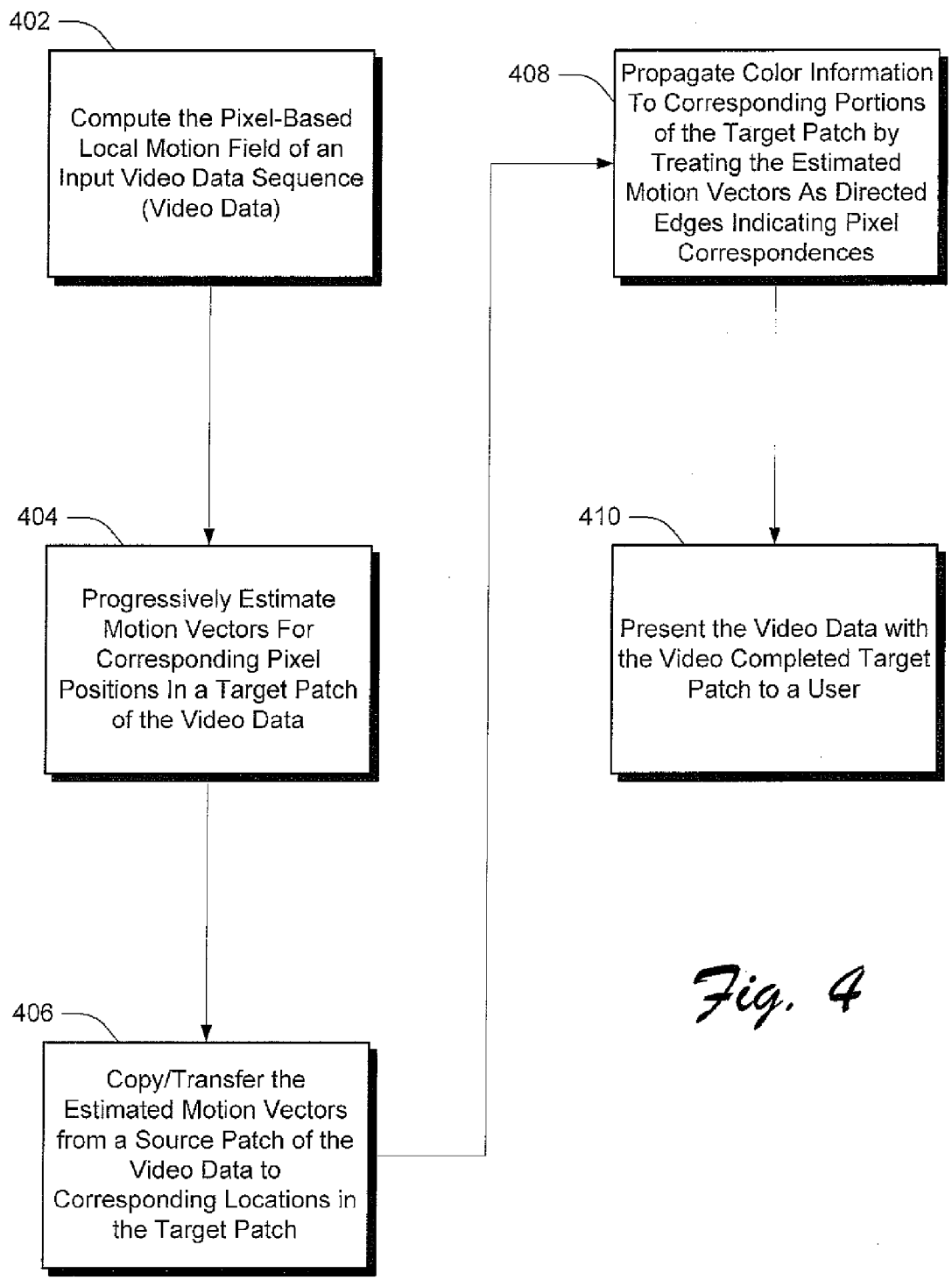
FIG. 4 shows an exemplary procedure for video completion by motion field transfer, according to one embodiment.

FIG. 4 shows an exemplary procedure 400 for video completion by motion field transfer, according to one embodiment. For purposes of exemplary illustration, the operations of procedure 400 are described with respect to the above described aspects of FIGS. 1-3. In one implementation, the operations of procedure 400 are implemented by video completion module 112. Operations at block 402 compute the pixel-based local motion field 116 of an input video data sequence (video data 120). Operations at block 404 progressively estimate motion vectors 124 for corresponding pixel positions in a target patch 122 of the video data 120. Operations of block 406 copy/transfer the estimated motion vectors 124 from a source patch 118 of the video data 120 to corresponding locations in a target patch 122. Operations of block 408 propagate color information to corresponding portions of the target patch 122. This is accomplished by treating the estimated motion vectors 124 as directed edges indicating pixel correspondences. Operations of block 410 present the video data 120 with the video completed target patch 122 to a user for viewing Alternate Embodiments In one implementation, video completion module provides frame rate recovery operations, for example, for video generated in a chat session, etc. In this implementation the video completion operations treat intermediate frames of a first input video data sequence 120 as missing frames (respective target patches 122) that are filled in with motion fields from a different input video data sequence 120. For example, in one implementation, the first input video data sequence is a real-time sequence, and the different input video data sequence is a prior/non-real-time video data sequence. Video completion module pre-computes the local motion 116 from the prior video data sequence. The pre-computed local motion is re-computed with a same frame rate is the real-time video data sequence. Video completion module 112 performs motion transfer operations to identify the most similar motion source patch 118 from the prior video. Responsive to locating the source patch 118, video completion module 112 transfers the full-resolution motion fields associated with the located source patch 118 to the low-frame rate video to achieve a higher frame rate.

In another example, by computing and transferring the motion field 116 from a prior (non-real-time) video 120, video completion module 112 synthesizes intermediate video image frames for insertion into the real-time video data sequence. Video completion module 112 (or a different video playback application) presents the resulting video data, wherein the synthesized and inserted frames appear seamless with the presented real-time video frames. In one implementation, when the number of frames and the video data 120 is doubled due to the addition of synthesized frame, the frame rate doubles. For purposes of exemplary illustration, such synthesized frames are shown as a respective portion of "other program data" 126 of FIG. 1.

Conclusion

Although video completion by motion field transfer has been described with reference to FIGS. 1-4 in language specific to structural features and/or methodological operations or actions, it is understood that the implementations defined in the appended claims are not necessarily limited to the specific features or actions described. Rather, the specific features and operations discussed above are disclosed as exemplary forms of implementing the following claimed subject matter.

The invention claimed is:

1. A method at least partially implemented by a computing device, the method comprising:
   under control of one or more computing systems comprising one or more processors,
      computing local motion fields corresponding to pixels in a video data sequence;
      estimating low-level motion vectors from the local motion fields for target pixel positions, the estimating the low-level motion vectors progressively advancing from estimating low-level motion vectors for boundary pixels of the target pixel positions to estimating low-level motion vectors for pixels located in inner portions of the target pixel positions;
      determining a source pixel positions including low-level motion vectors that are collectively most similar to the low-level motion vectors for the target pixel positions; and
      copying the low-level motion vectors included in the source pixel positions to the target pixel positions.

2. The method of claim 1, wherein the target pixel positions are spatio-temporal region of the video data sequence.

3. The method of claim 1, wherein the target pixel positions comprise missing pixels, and the pixel in the video data sequence does not include the missing pixels.

4. The method of claim 1, further comprising removing or replacing pixel information in the target pixel positions.

5. The method of claim 1, comprising propagating color information to the corresponding portions by treating the low-level motion vectors as directed edges indicating pixel correspondences.

6. The method of claim 1, wherein the determining is based on dissimilarity measurements of motion vectors.

7. The method of claim 6, comprising determining dissimilarity between the source pixel positions and the target pixel positions by aggregating a dissimilarity measure over the source pixel positions and the target pixel positions.

8. A computing device comprising:
   a processor; and
   a memory coupled to the processor, the memory comprising computer-program instructions executable by the processor, the computer-program instructions when executed by the processor for performing operations comprising:
      computing local motion fields for pixels in a video data sequence; for a target region of the video data sequence, estimating low-level motion vectors from the local motion fields for corresponding pixel positions in the target region, the low-level motion vectors representing motion from a spatio-temporal source patch of the video data sequence, the motion being more similar to motion of the target region than motion associated with other portions of the video data sequence, the estimating the low-level motion vectors progressively advancing from estimating low-level motion vectors for boundary pixels of the target region to estimating low-level motion vectors for pixels located in inner portions of the target region;
      transferring the low-level motion vectors to corresponding positions in the target region to generate a video completed target region; and
      presenting the video data sequence comprising the video completed target region to a user.

9. The computing device of claim 8, wherein the computer-program instructions for progressively estimating the low-level motion vectors further comprise instructions for aggregating dissimilarity of motion information between a spatio-temporal source patch of multiple source patches and the target region to identify the low-level motion vectors.

10. The computing device of claim 8, wherein transferring the low-level motion vectors:
   replaces or removes original motion and pixel color information from the target region; and/or
   provides missing motion and pixel color information to the target region.

11. The computing device of claim 8, wherein the computer-program instructions further comprise instructions for propagating color information to the target region from the spatio-temporal source patch by treating the low-level motion vectors as directed edges indicating pixel correspondences.

12. A tangible computer-readable data storage medium comprising computer-program instructions executable by a processor, the computer-program instructions when executed by the processor for performing operations comprising:
   computing local motion fields corresponding to pixels in a video data sequence;
   estimating low-level motion vectors from the local motion fields for corresponding pixel positions in a spatio-temporal target patch from pixels located in boundary portions of the spatio-temporal target patch to pixels located in inner portions of the spatio-temporal target patch, the low-level motion vectors being most similar to motion information in the spatio-temporal target patch as compared to motion information in other spatio-temporal source patches of the video data sequence;
   copying the motion vectors to corresponding positions in the spatio-temporal target patch; and
   presenting the video data sequence to a user.

13. The computer-readable data storage medium of claim 12, wherein the computer-program instructions for estimating the low-level motion vectors further comprise instructions for aggregating dissimilarity of motion information between a spatio-temporal source patch and the spatio-temporal target patch to identify the low-level motion vectors.

14. The computer-readable data storage medium of claim 12, wherein the computer-program instructions further comprise instructions for propagating color information to corresponding portions by treating the low-level motion vectors as directed edges indicating pixel correspondences.

15. The computer-readable data storage medium of claim 12, wherein the video data sequence is a real-time video data sequence.

16. The computer-readable data storage medium of claim 12, wherein the computer-program instructions for estimating the low-level motion vectors further comprise instructions for performing frame-rate recovery operations when synthesizing image frames from a prior video data sequence for insertion into the video data sequence.

17. The computer-readable data storage medium of claim 12, wherein the estimating low-level motion vectors is independent of temporal consistency of color across respective ones of frames of the video data sequence.

* * * * *